(12) United States Patent
Vachon et al.

(10) Patent No.: US 12,384,288 B2
(45) Date of Patent: Aug. 12, 2025

(54) STRAP ANCHOR FOR SECURING AN ACCESSORY TO A VEHICLE USING A STRAP AND METHOD THEREFOR

(71) Applicant: BOMBARDIER RECREATIONAL PRODUCTS INC., Valcourt (CA)

(72) Inventors: Marc Vachon, St-Denis-de-Brompton (CA); Magali Bitsch, Saint-Francois-Xavier-de-Brompton (CA); Pierre-Luc Robillard, Sherbrooke (CA); Simon Baldachino, Bromont (CA); Nabil Guendoul, Granby (CA); Michel Bourassa, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 461 days.

(21) Appl. No.: 18/072,381

(22) Filed: Nov. 30, 2022

(65) Prior Publication Data
US 2024/0174164 A1    May 30, 2024

(51) Int. Cl.
*B60P 7/00*    (2006.01)
*B60P 7/08*    (2006.01)

(52) U.S. Cl.
CPC .......... *B60P 7/0807* (2013.01); *B60P 7/0823* (2013.01)

(58) Field of Classification Search
CPC .............. B60P 7/0823; B60P 7/0807
USPC ............................... 410/113, 101
See application file for complete search history.

(56) References Cited

U.S. PATENT DOCUMENTS

| 8,777,531 | B2 | 7/2014 | Massicotte et al. |
| 8,875,830 | B2 * | 11/2014 | Massicotte ............... B60R 9/06 |
| | | | 180/89.1 |
| 9,505,335 | B2 | 11/2016 | Massicotte et al. |
| 9,511,704 | B2 | 12/2016 | Massicotte et al. |
| 9,751,592 | B2 | 9/2017 | Labbe et al. |
| 10,227,110 | B1 | 3/2019 | Valence et al. |
| 10,391,949 | B2 | 8/2019 | Labbe et al. |
| 10,730,576 | B2 | 8/2020 | Labbe et al. |
| 10,744,953 | B2 | 8/2020 | Labbe et al. |
| 10,850,806 | B2 | 12/2020 | Labbe et al. |

(Continued)

OTHER PUBLICATIONS https://www.rockymountainatvmc.com/parts/tusk-cargo-anchor-p, retrieved from Rocky Mountain ATV-MC.com's website on May 5, 2023.

*Primary Examiner* — Steven O Douglas
(74) *Attorney, Agent, or Firm* — BCF LLP

(57) ABSTRACT

A strap anchor for securing an accessory to a vehicle with a strap includes: a mounting portion including anchor base configured to engage an upper surface of an accessory receiving base connected to the vehicle and an anchor lock connected to the anchor base, the anchor lock being configured to be inserted through an aperture defined by the accessory receiving base; and a pivoting portion that is pivotably connected to the mounting portion about a pivot axis, the pivoting portion including a strap-receiving part configured for engaging the strap therewith. The strap anchor is configured to be removably fixed to the accessory receiving base by inserting the anchor lock through the aperture and turning the mounting portion such that the anchor lock is prevented from being extracted through the aperture. A method for securing an accessory to a vehicle using a strap anchor is also disclosed.

22 Claims, 14 Drawing Sheets

(56) References Cited

U.S. PATENT DOCUMENTS

| | | |
|---|---|---|
| 10,941,801 B2 | 3/2021 | Roy et al. |
| 11,235,829 B2 | 2/2022 | Robillard et al. |
| 2005/0180835 A1* | 8/2005 | Schneider ............. B60P 7/0823 |
| | | 410/100 |
| 2011/0064535 A1* | 3/2011 | Tardif ................... B60P 7/0807 |
| | | 410/101 |
| 2014/0026373 A1* | 1/2014 | Seader ................... A44B 11/12 |
| | | 24/193 |
| 2020/0339040 A1 | 10/2020 | Labbe et al. |
| 2020/0406730 A1 | 12/2020 | Fournier et al. |
| 2021/0039749 A1 | 2/2021 | Labbe et al. |

* cited by examiner

STRAP ANCHOR FOR SECURING AN ACCESSORY TO A VEHICLE USING A STRAP AND METHOD THEREFOR

TECHNICAL FIELD

The present technology relates to anchors for securing accessories to a vehicle.

BACKGROUND

In many recreational vehicles, it is generally desirable to have an area for mounting accessories such as storage containers (e.g., coolers), bags, and fuel caddies to provide more cargo-carrying capacity. For example, some personal watercrafts (PWCs), all-terrain vehicles (ATVs), side-by-side vehicles (SSVs) and snowmobiles are designed to provide anchoring points at which anchors connected to the accessory can be fixed.

While this provides a quick and convenient way to secure an accessory to the vehicle, such anchors are typically only compatible with accessories that have a rigid base to support the anchors. Indeed, these anchors are often unsuitable for an accessory having a flexible exterior material without a rigid base fixed thereto. To address this, some anchors have been designed to accommodate the use of a strap and are mountable at the anchor mounting points of the vehicle. The strap is tied to the anchor and to the accessory to thereby secure the accessory to the vehicle. However, these "strap" anchors are often difficult to mount, notably requiring tools to install and uninstall, which can prevent a user from removing the anchors, thereby hindering the versatility of the anchor mounting points provided on the vehicle.

In view of the foregoing, there is a need for a strap anchor that addresses at least in part some of these defects.

SUMMARY

It is an object of the present technology to ameliorate at least some of the inconveniences present in the prior art.

According to one aspect of the present technology, there is provided a strap anchor for securing an accessory to a vehicle with a strap, the strap anchor comprising: a mounting portion comprising: an anchor base configured to engage an upper surface of an accessory receiving base connected to the vehicle, the anchor base being generally elongated; and an anchor lock connected to the anchor base, the anchor lock having a generally hexagonal shape that is elongated, the anchor lock being configured to be inserted through an aperture defined by the accessory receiving base; and a pivoting portion that is pivotably connected to the mounting portion about a pivot axis, the pivoting portion comprising a strap-receiving part configured for engaging the strap therewith, the strap anchor being configured to be removably fixed to the accessory receiving base by inserting the anchor lock through the aperture and then turning the mounting portion relative to the accessory receiving base such that the anchor lock is prevented from being extracted through the aperture.

In some embodiments, the anchor lock has at least one upper tapered surface configured to engage a lower surface of the accessory receiving base during turning of the mounting portion relative to the accessory receiving base.

In some embodiments, the strap anchor is configured to be fixed to the accessory receiving base by turning the mounting portion by a quarter turn about a turning axis extending, in use, through the aperture.

In some embodiments, the anchor base comprises at least one locking tab protruding downwardly from a lower base surface of the anchor base to engage an inner surface of the accessory retaining base defining the aperture.

In some embodiments, without the strap engaged with the strap-receiving part, the pivoting portion is free to pivot relative to the mounting portion a full rotation about the pivot axis.

In some embodiments, the anchor base comprises a first protruding body and a second protruding body spaced from each other; and part of the pivoting portion is disposed between the first protruding body and the second protruding body.

In some embodiments, the pivoting portion is pivotable relative to the mounting portion about the pivot axis extending between the first and second protruding bodies; each of the first and second protruding bodies comprises an inner body surface facing the pivot axis; the inner surfaces of the first and second protruding bodies are curved and spaced from a curved outer surface of the part of the pivoting portion.

In some embodiments, each of the first and second protruding bodies has an upper body surface; and an upper surface of the part of the pivoting portion is generally aligned with the upper body surfaces of the first and second protruding bodies.

In some embodiments, the strap-receiving part is configured to adjust a position of an end of the strap relative to the strap-receiving part.

In some embodiments, the strap-receiving part is a ladder lock buckle.

In some embodiments, the ladder lock buckle comprises a first bar and a second bar extending generally parallel to each other.

In some embodiments, the pivoting portion is connected to the mounting portion by a fastener.

In some embodiments, the mounting portion defines an opening; the pivoting portion comprises a stem extending within the opening of the mounting portion, the stem extending along the pivot axis; and the fastener retains the stem within the opening to prevent the pivoting portion from being disengaged from the mounting portion.

In some embodiments, the fastener comprises a fastener head, the fastener head being disposed at a lower end of the pivoting portion.

In some embodiments, the mounting portion further comprises an outer stem extending between the anchor base and the anchor lock.

In some embodiments, the anchor lock comprises two cams extending from the outer stem in opposite directions from each other.

In some embodiments, the anchor base is elongated in a first direction; and the anchor lock is elongated in a second direction that is generally perpendicular to the first direction In some embodiments, an anchor assembly for securing an accessory to a vehicle comprises: the strap anchor; and a strap engaged with the strap-receiving part, the strap being configured to be tied to the accessory in order to secure the accessory to the vehicle.

According to another aspect of the present technology, there is provided a vehicle comprising: an accessory receiving base defining at least one aperture having a generally elongated hexagonal shape; and at least one strap anchor removably fixed to the accessory receiving base, the anchor lock of the at least one strap anchor being disposed beneath a lower surface of the accessory receiving base and being oriented to prevent extraction of the anchor lock through the at least one aperture.

According to another aspect of the present technology, there is provided a method for securing an accessory to a vehicle using a strap anchor, the strap anchor comprising a mounting portion and a pivoting portion that is pivotable relative to the mounting portion, the method comprising: inserting an anchor lock of the mounting portion of the strap anchor through an aperture of an accessory receiving base connected to the vehicle until an anchor base of the mounting portion engages an upper surface of the accessory receiving base; turning the strap anchor to orient the anchor lock such that the anchor lock is prevented from being extracted through the aperture; and tying a strap engaged with a strap-receiving part of the pivoting portion to the accessory.

In some embodiments, the method also comprises adjusting a position of an end of the strap relative to the strap-receiving part in order to adjust a force exerted by the strap on the accessory.

In some embodiments, the strap is tied to the accessory prior to turning the strap anchor.

For purposes of this application, the terms related to spatial orientation such as forwardly, rearward, left and right, are as they would normally be understood by an operator of a vehicle sitting thereon in a normal driving position.

Embodiments of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
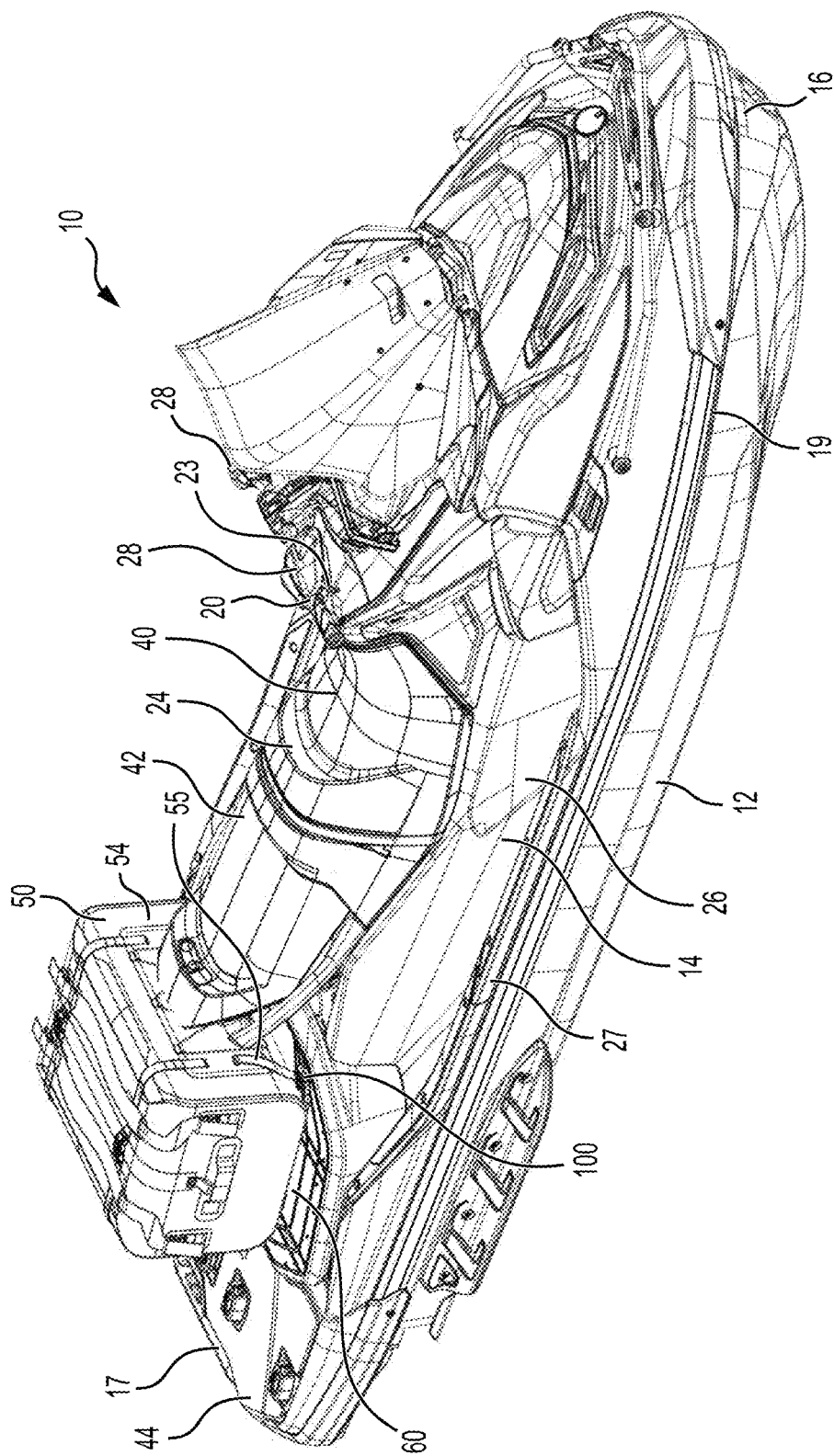
FIG. 1 is a perspective view, taken from a top, front, right side, of a personal watercraft equipped with strap anchors in accordance with an embodiment of the present technology for securing an accessory to the watercraft.
Figure 2:
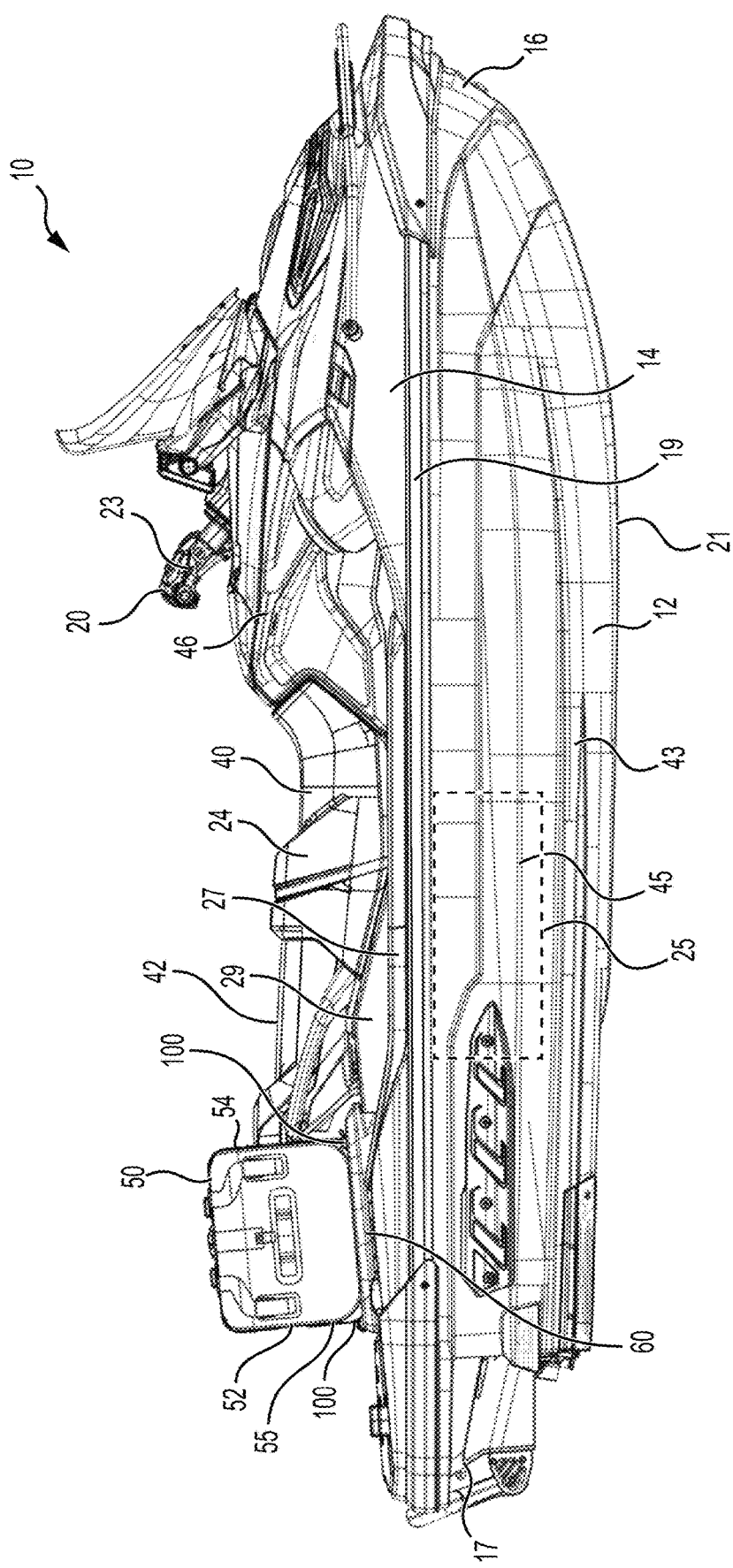
FIG. 2 is a right side elevation view of the watercraft of FIG. 1.
Figure 3:
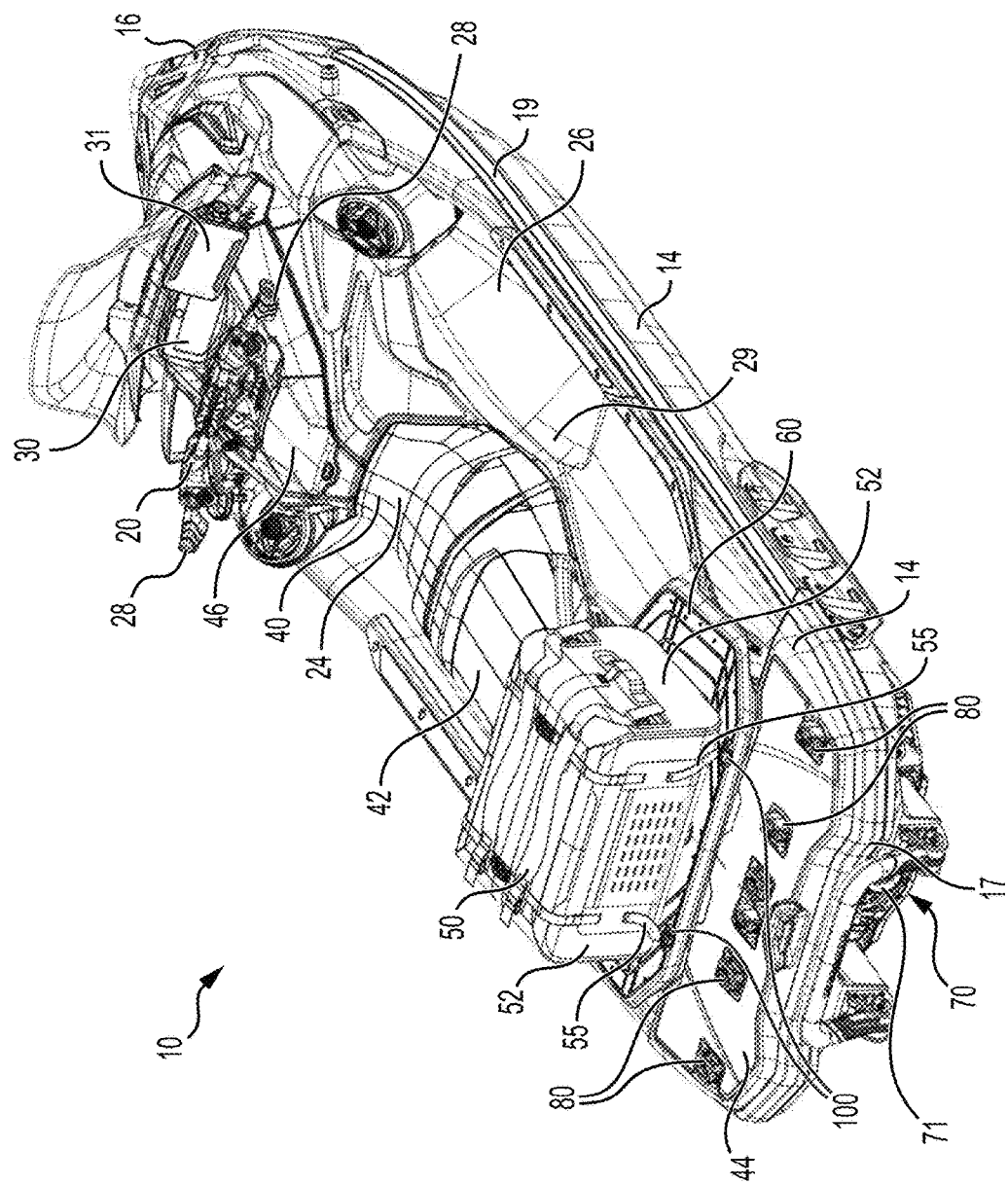
FIG. 3 is a perspective view, taken from a top, rear, right side, of the watercraft of FIG. 1.
Figure 4:
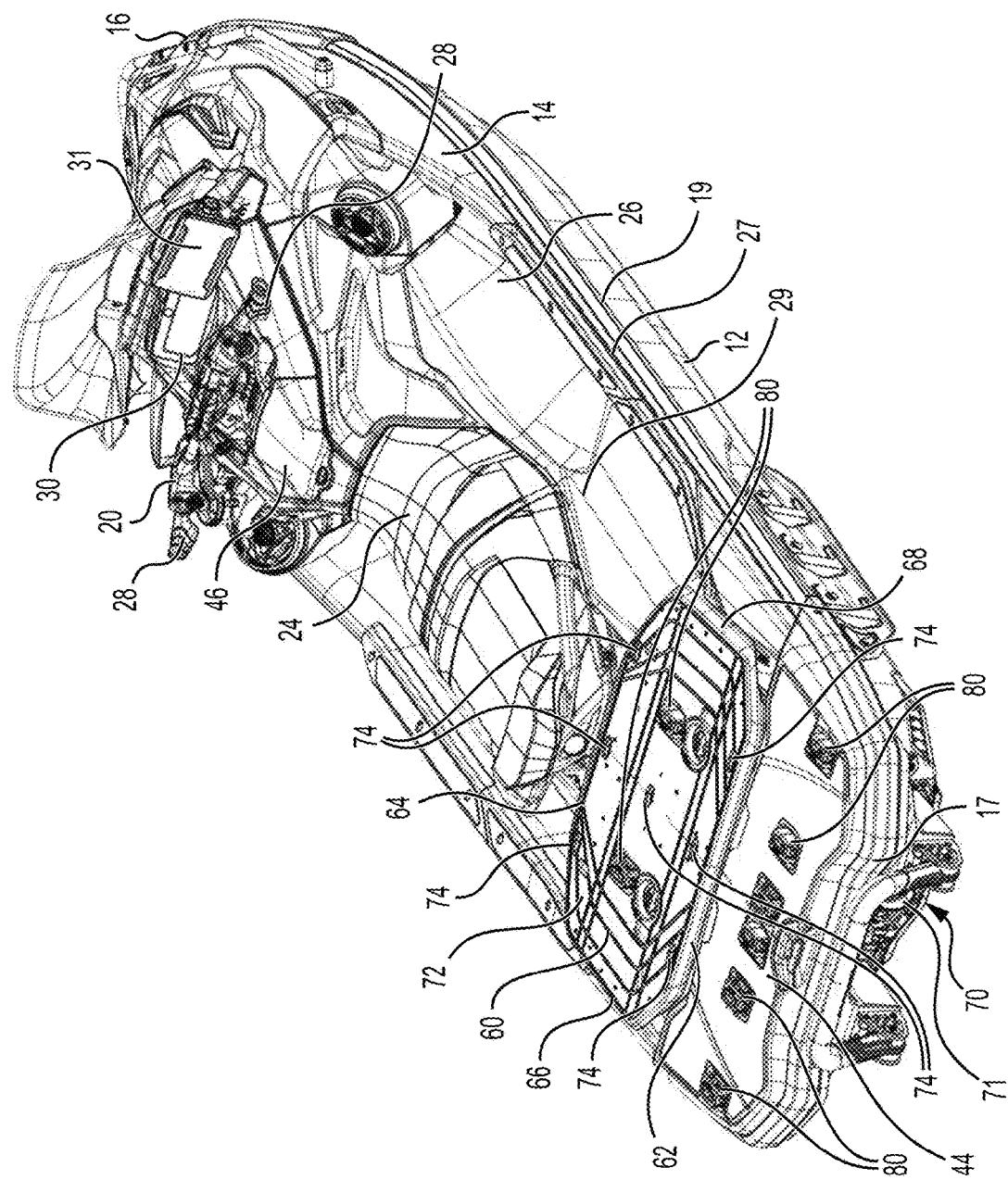
FIG. 4 is a perspective view, taken from a top, rear, right side, of the watercraft of FIG. 1, shown without the accessory and the strap anchors.

FIGS. 1 to 3 show a vehicle provided with a plurality of strap anchors 100 in accordance with an embodiment of the present technology. In this embodiment, the vehicle is a personal watercraft (PWC) 10. It is contemplated that the vehicle may be any other suitable type of vehicle in other embodiments such as an off-road vehicle (e.g., an all-terrain vehicle (ATV), a snowmobile, etc.) or a road vehicle. As will be described in detail further below, the strap anchors 100 facilitate securing an accessory 50 (such as a waterproof bag, as shown in FIGS. 1 to 3) to the PWC 10.

The PWC 10 will now be generally described with reference to FIGS. 1 to 3. The PWC 10 has a hull 12 and a deck 14 supported by the hull 12. The hull 12 buoyantly supports the PWC 10 in the water. The deck 14 is designed to accommodate one or multiple riders. The hull 12 and the deck 14 are joined together at a seam that joins the parts in a sealing relationship. A bumper 19 generally covers the seam 16, which helps to prevent damage to the outer surface of the PWC 10 when the PWC 10 is docked, for example.

The hull 12 has a bow 16 and a stern 17 opposite the bow 16, as well as a laterally centered keel 21. The hull 12 also has strakes 43 and chines 45 on each lateral side thereof. A strake 43 is a protruding portion of the hull 12. The chines 45 are the vertices formed where two surfaces of the hull 12 meet.

The deck 14 has a centrally positioned straddle-type seat 24 positioned on top of a pedestal 29 to accommodate multiple riders in a straddling position. The seat 24 includes a front seat portion 40 and a rear, raised seat portion 42. The seat 24 is preferably made as a cushioned or padded unit, or as interfitting units. The front and rear seat portions 40, 42 are removably attached to the pedestal 29. The seat portions 32, 34 can be individually tilted or removed completely. Seat portion 40 covers a motor access opening defined by a top portion of the pedestal 29 to provide access to a motor 25 (shown schematically in FIG. 2).

The PWC 10 has a pair of generally upwardly extending walls located on either side of the PWC 10 known as gunwales or gunnels 27. The gunnels 27 help to prevent the entry of water in footrests 26 of the PWC 10, provide lateral support for the riders' feet, and also provide buoyancy when turning the PWC 10, since the personal PWC 10 rolls slightly when turning. Towards the rear of the PWC 10, the gunnels 27 extend inwardly to act as heel rests. A passenger riding the PWC 10 facing towards the rear, to spot a water-skier for example, may place his or her heels on the heel rests, thereby providing a more stable riding position. Heel rests could also be formed separately from the gunnels 27.

Located on both sides of the PWC 10, between the pedestal 29 and the gunnels 27, are the left and right footrests 26 which are disposed on opposite sides of a longitudinal centerplane of the PWC 10 that bisects a width thereof. The footrests 26 are designed to accommodate the riders' feet in various riding positions. The footrests 26 are covered by carpeting made of a rubber-type material, for example, to provide additional comfort and traction for the feet of the riders.

A reboarding platform 44 is provided at the rear of the PWC 10 on the deck 14 to allow the rider or a passenger to easily reboard the PWC 10 from the water. Nonslip mats or some other suitable covering may cover the reboarding platform 40. A retractable ladder (not shown) may be affixed to a transom of the stern 17 to facilitate boarding the PWC 10 from the water onto the reboarding platform 44. In this embodiment, a plurality of anchor fixtures 80 are provided on the reboarding platform 44. The anchor fixtures 80 are configured to receive an anchor and/or a tongue fastener for securing accessories thereto. Such anchor fixtures and their functionality are described in detail in U.S. Pat. No. 10,227, 110, issued Mar. 12, 2019, the entirety of which is incorporated by reference herein.

As seen in FIG. 1, the PWC 10 is provided with a hood 46 located forwardly of the seat 24 and a helm assembly 20. A hinge (not shown) is attached between a forward portion of the hood 46 and the deck 14 to allow the hood 46 to move to an open position to provide access to a front storage bin. A latch (not shown) located at a rearward portion of the hood 46 locks the hood 46 into a closed position. When in the closed position, the hood 46 prevents water from entering the front storage bin 24.

As best seen in FIG. 2, the helm assembly 20 is positioned forwardly of the seat 24. The helm assembly 20 has a central helm portion, that is padded, and a pair of steering handles 28, also referred to as a handlebar. One of the steering handles 28 is provided with a throttle operator 23, which allows the rider to control the motor 25, and therefore the speed of the PWC 10. The throttle operator 23 is a finger-actuated throttle lever. However, it is contemplated that the throttle operator 23 could take other forms, such as a thumb-actuated throttle lever or a twist grip. The throttle operator 23 is movable between an idle position and multiple actuated positions. In this embodiment, the throttle operator 23 is biased towards the idle position, such that, should the driver of the PWC 10 let go of the throttle operator 23, it will move to the idle position. The other of the steering handles 65 is provided with a reverse gate operator (not shown) used by the driver to actuate a reverse gate (not shown) of the PWC 10. The reverse gate operator is a finger-actuated lever. However, it is contemplated that the reverse gate operator could be a thumb-actuated lever or a twist grip.

The helm assembly 20 is provided with a key receiving post (not shown) located near a center of the central helm portion. The key receiving post is adapted to receive a key required to start the PWC 10. It should be noted that the key receiving post may be placed in any suitable location on the PWC 10.

As shown in FIG. 3, a display area or cluster 30 is located forwardly of the helm assembly 20. The display cluster 30 can be of any conventional display type, including a liquid crystal display (LCD), dials or LED (light emitting diodes). The central helm portion has various buttons, which could alternatively be in the form of levers or switches, that allow the driver to modify the display data or mode (speed, engine rpm, time, etc.) on the display cluster 30 or to change a condition of the PWC 10, such as trim (the pitch of the PWC 10). In this embodiment, the PWC 10 also has a navigation device 31 (e.g., a GPS device) to the right of the display cluster 30.

With reference to FIG. 2, the motor 25 is supported by the hull 12 and is enclosed within a motor compartment defined between the hull 12 and the deck 14. The motor 25 is configured for driving a jet propulsion system 70 (also commonly referred to as a "jet pump drive") which propels the PWC 10. The motor compartment accommodates the motor 25, as well as a muffler, gas tank, electrical system (battery, electronic control unit, etc.), air box, storage bins, and other elements required or desirable in the PWC 10. In this embodiment, the motor 25 is an internal combustion engine 25 and will thus be referred to as the engine 25. However, it is contemplated that, in alternative embodiments, the motor 25 may be any other suitable type of motor such as an electric motor. As will be understood, in such an embodiment, certain components of the PWC 10 would be added to (e.g., a battery pack) or omitted from (e.g., no muffler and gas tank, etc.).

As mentioned above, the PWC 10 is propelled by the jet propulsion system 70 which pressurizes water to create thrust. To that end, the jet propulsion system 50 has a duct (not shown) in which water is pressurized and which is defined by various components of the jet propulsion system 70, including an intake ramp (not shown), an impeller housing (not shown), and a steering nozzle 71 of the jet propulsion system 70. A driveshaft is connected between the engine 25 and an impeller (not shown) of the jet propulsion system 70. A bellow assembly (not shown) is mounted to the driveshaft and provides a seal between the duct and the hull 12 such as to prevent entry of water into the hull 12.

The PWC 10 is also provided with a reverse gate (not shown) which is movable between a stowed position where it does not interfere with the jet of water being expelled rearwardly along the duct by the jet propulsion system 70 and a plurality of positions where it redirects the jet of water being expelled rearwardly along the duct by the jet propulsion system 70. Notably, the reverse gate can be actuated into a neutral position in which the thrust generated by the jet propulsion system 70 does not have a horizontal component such that the PWC 10 will not be accelerated or decelerated by the thrust and will stay in position if it was not moving prior to moving the reverse gate in the neutral position. The reverse gate can also be actuated into a reverse position as it redirects the jet of water towards the front of the PWC 10, thus causing the PWC 10 to move in a reverse direction. A reverse gate actuator (not shown), in the form of an electric motor, is operatively connected to the reverse gate to move the reverse gate. The reverse gate actuator could alternatively be any one of a mechanical, a hydraulic, or another type of electric actuator.

The PWC 10 also has other features and characteristics that are commonly known in the art and will therefore not be described herein.

Figure 5:
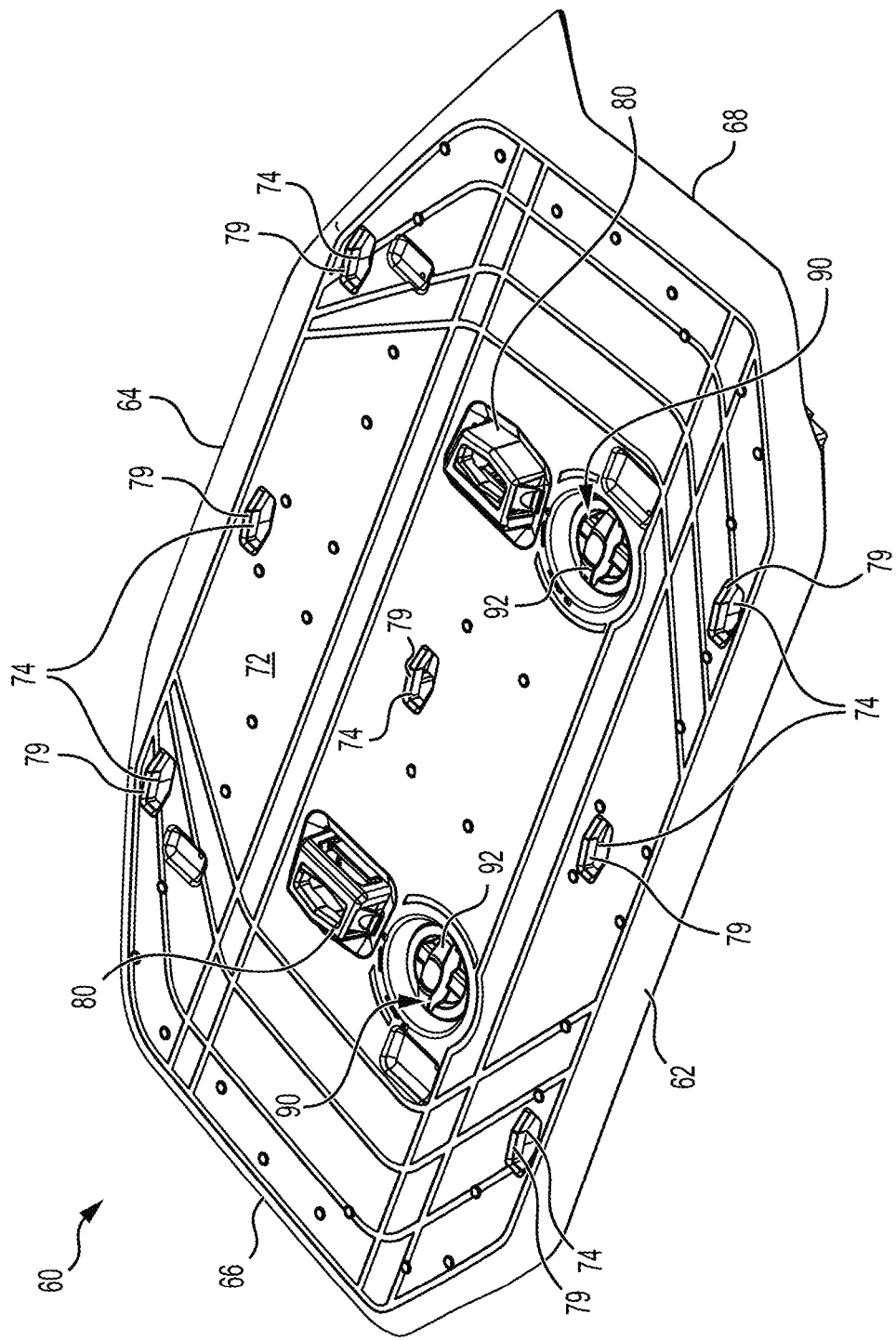
FIG. 5 is a perspective view, taken from a top, rear, right side, of an accessory receiving base of the watercraft of FIG. 1.
Figure 6:
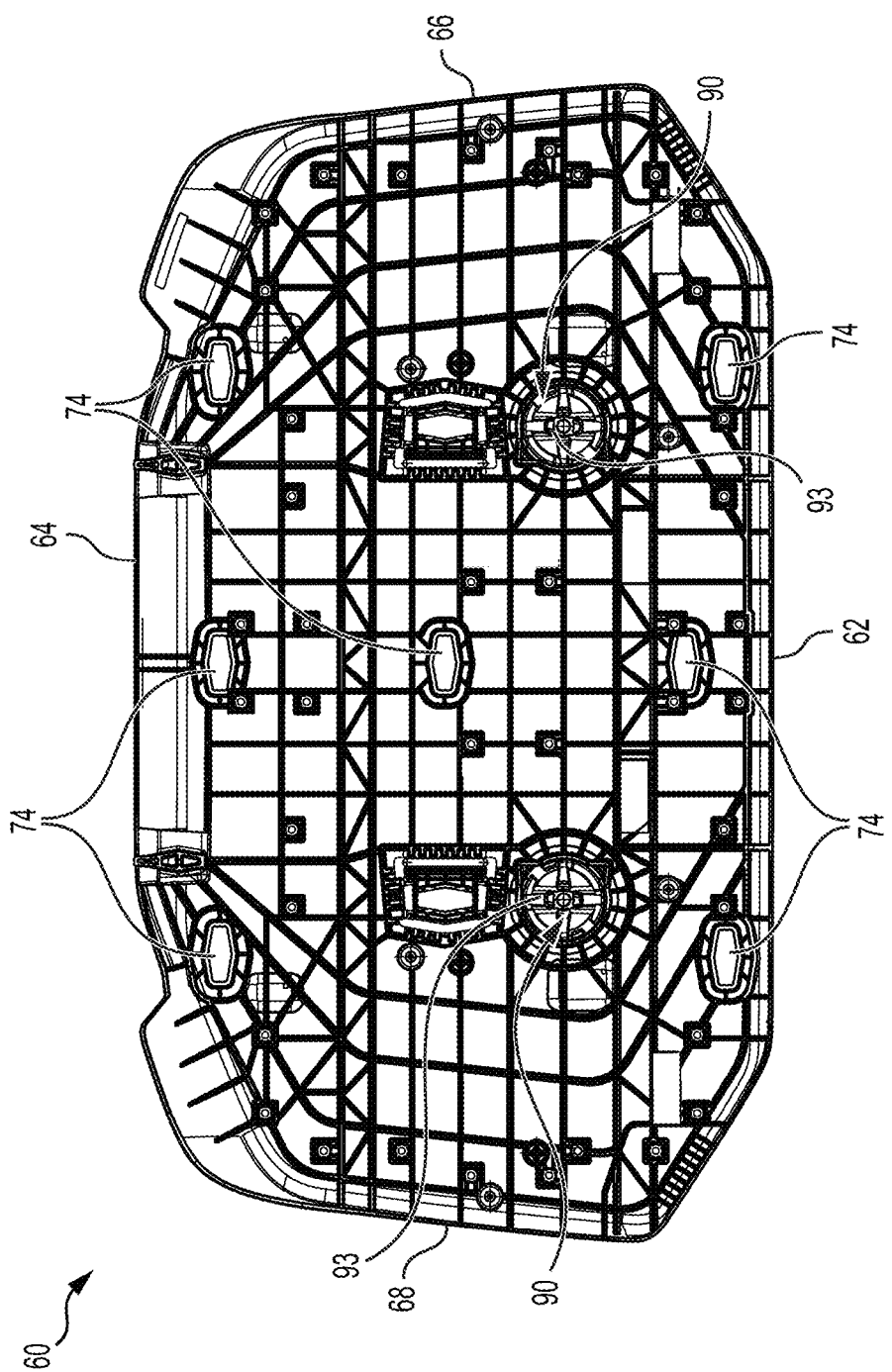
FIG. 6 is a bottom plan view of the accessory receiving base of FIG. 5.

As shown in FIGS. 1 to 3, the PWC 10 has an accessory receiving base 60 that is configured for securing the accessory 50 thereto and for removably connecting the strap anchors 100 thereto. In this embodiment, the accessory receiving base 60 is fastened to the deck 14. With particular reference to FIGS. 5 and 6, the accessory receiving base 60 has a rear end 62, a front end 64 and left and right ends 66, 68. In this example, the accessory receiving base 60 is disposed behind the seat 24. The accessory receiving base 60 has an upper surface 72 (FIG. 5) on an upper side thereof and a lower surface 75 (FIG. 6) on a lower side thereof opposite the upper side. The accessory receiving base 60 defines a plurality of apertures 74 configured to receive respective ones of the strap anchors 100 as will be described in greater detail below. As can be seen, each aperture 74 extends from the upper surface 72 to the lower surface 75. In this example, each aperture 74 has a generally elongated hexagonal shape. That is, each aperture 74 is defined by a respective inner surface 79 of the accessory receiving base 60, each inner surface 79 having six sides and being elongated along a given direction. The shape of each aperture 74 is also symmetrical.

In this embodiment, the apertures 74 of the accessory receiving base 60 are aligned in respective rows. Notably, at least two of the apertures 74 are aligned with each other in a lateral direction of the PWC 10. In other embodiments, the apertures 74 may not be aligned with each other in the lateral direction of the PWC 10.

As shown in FIG. 5, in this embodiment, the accessory receiving base 60 also has two of the retractable anchor fixtures 80 that are configured to receive an anchor and/or a tongue fastener for securing accessories thereto. The anchor fixtures 80 may be omitted in other embodiments.

In this embodiment, the accessory receiving base 60 has two attaching mounts 90 that are operable by a user to secure the accessory receiving base 60 to the deck 14. As shown in FIGS. 5 and 6, each attaching mount 90 includes a handle 92 (FIG. 5) disposed on the upper side of the accessory receiving base 60 and a locking member 93 (FIG. 6) disposed on the lower side of the accessory receiving base 60. The handle 92 is connected to the locking member 93 and is pivotable together with the locking member 93. In this example, in order to secure the accessory receiving base 60 to the deck 14, the locking member 93 of each attaching mount 90 is inserted through a corresponding aperture (not shown) defined by the deck 14 (similar to the apertures 74) and the handle 92 is pivoted to cause the locking member 93 to pivot and be disposed in an orientation that prevents the locking member 93 from being extracted through the aperture.

It is contemplated that the accessory receiving base 60 could be secured to the deck 14 differently in other embodiments (e.g., via bolts).

While in this embodiment the accessory receiving base 60 is a distinct component that is connected to the deck 14, it is contemplated that in other embodiments, the accessory receiving base 60 could be integrated as part of the deck 14. For instance, the deck 14 could itself define one or more apertures 74. Furthermore, in examples of other vehicles, the apertures 74 could be defined by a frame or a body of the vehicle.

The strap anchors 100 will now be described in greater detail with reference to FIGS. 7 to 12. In this embodiment, each strap anchor 100 is identical and therefore a single one of the strap anchors 100 will be described herein. It is to be understood that the same description applies to the other strap anchors 100.

Figure 9:
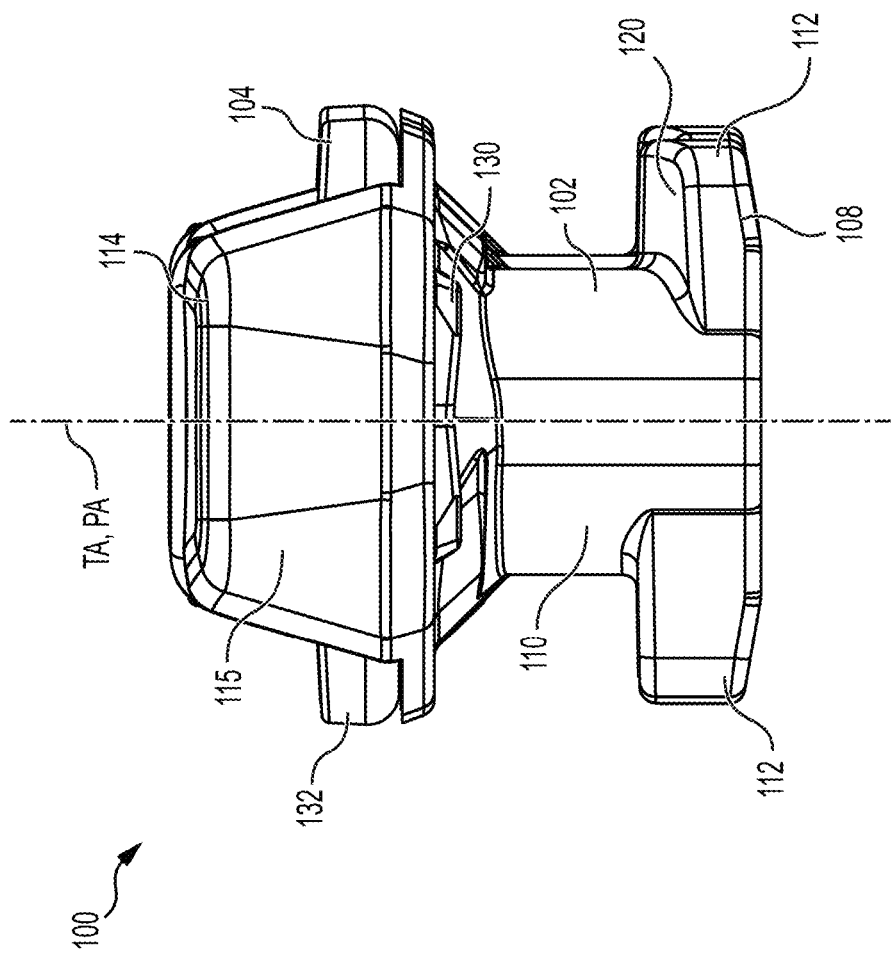
FIG. 9 is a left side elevation view of the strap anchor of FIG. 7.

The strap anchor 100 has a mounting portion 102 and a pivoting portion 104 that is pivotably connected to the mounting portion 102. In particular, the pivoting portion 104 is pivotable relative to the mounting portion 102 about a pivot axis PA (FIG. 9). The pivoting portion 104 has a strap-receiving part 138 that is configured for engaging a corresponding strap 55 therewith (FIG. 3). Notably, the strap 55 is tied to the accessory 50 in order to secure the accessory 50 to the PWC 10. The mounting portion 102 includes an anchor base 106, an anchor lock 108 and an outer stem 110 extending between the anchor base 106 and the anchor lock 108. In this embodiment, the anchor base 106, the anchor lock 108 and the outer stem 110 are a single-piece component (i.e., they are formed together and are made of a common continuous material). It is contemplated that, in other embodiments, one or more of the anchor base 106, the anchor lock 108 and the outer stem 110 could be a distinct piece fastened or otherwise attached to the others.

Figure 8:
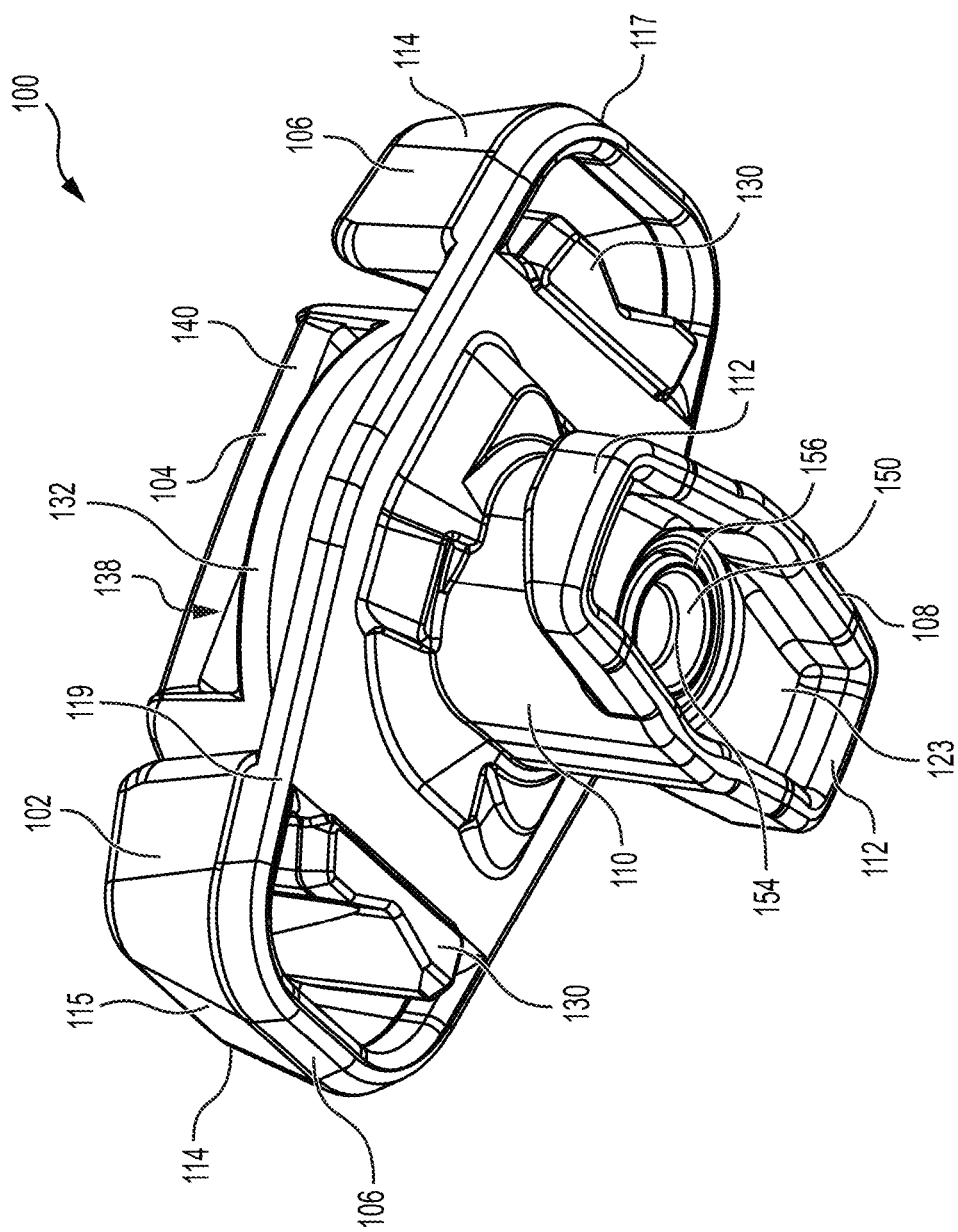
FIG. 8 is a perspective view, taken from a bottom, rear, left side, of the strap anchor of FIG. 7.
Figure 11:
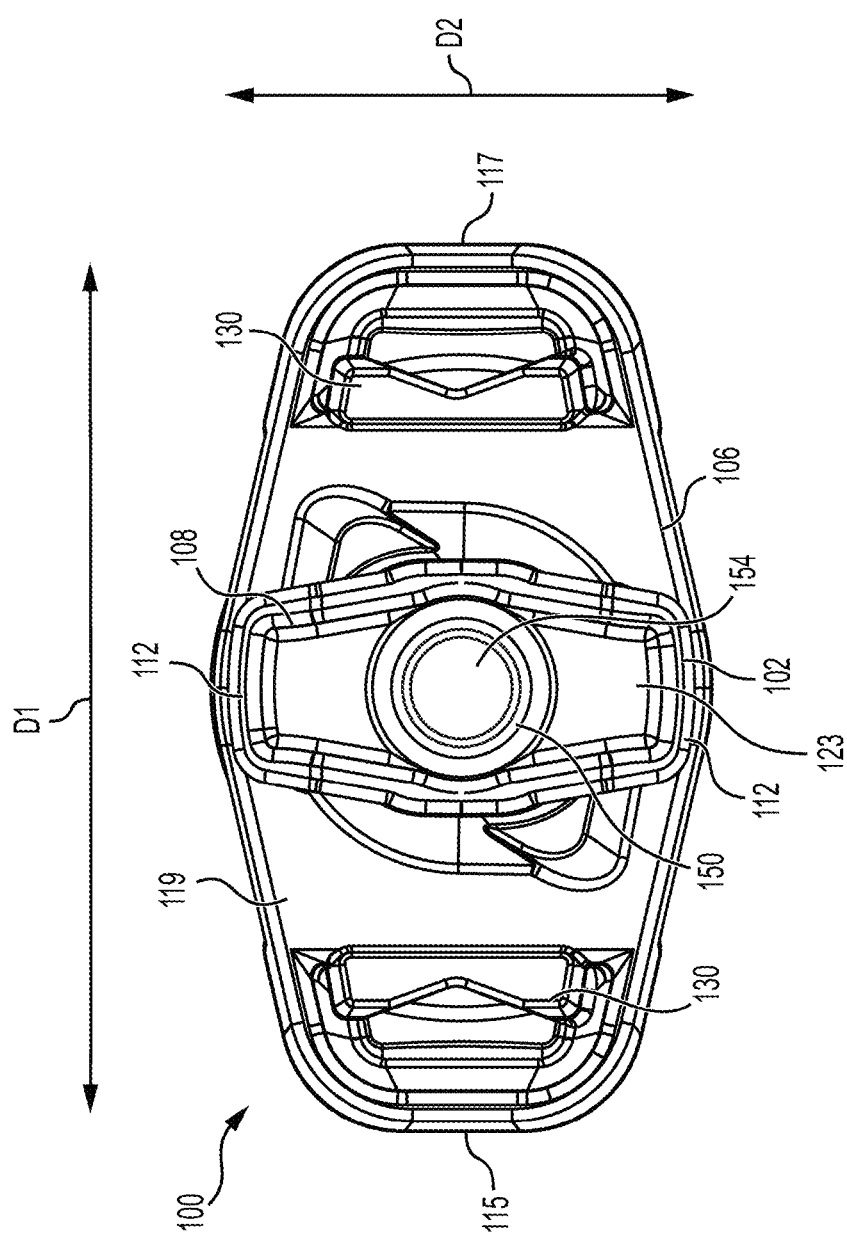
FIG. 11 is a bottom plan view of the strap anchor of FIG. 7.

As shown in FIGS. 8 and 11, the anchor base 106 has a lower surface 119 which, in use, engages the upper surface 72 of the accessory receiving base 60. As can be seen, in this example, the anchor base 106 has a generally elongated hexagonal shape and is generally elongated in a direction D1 (FIG. 11). Notably, the anchor base 106 extends from a proximal end 115 to a distal end 117 along the direction D1. It is contemplated that, in other embodiments, the anchor base 106 may have a shape different from a hexagonal shape. In this embodiment, the anchor base 106 has two protruding bodies 114 spaced from each other and extending upwardly from the lower surface 119. Each of the protruding bodies 114 defines a respective one of the proximal end 115 and the distal end 117.

As best shown in FIG. 8, in this embodiment, the anchor base 106 has two locking tabs 130 protruding downwardly from the lower surface 119 of the anchor base 106. The locking tabs 130 are configured to engage the inner surface 79 of the accessory receiving base 60 defining a corresponding one of the apertures 74, namely the extremities of the elongated shape of the inner surface 79, in order to help retain the strap anchor 100 in position when mounted to the accessory receiving base 60.

Figure 7:
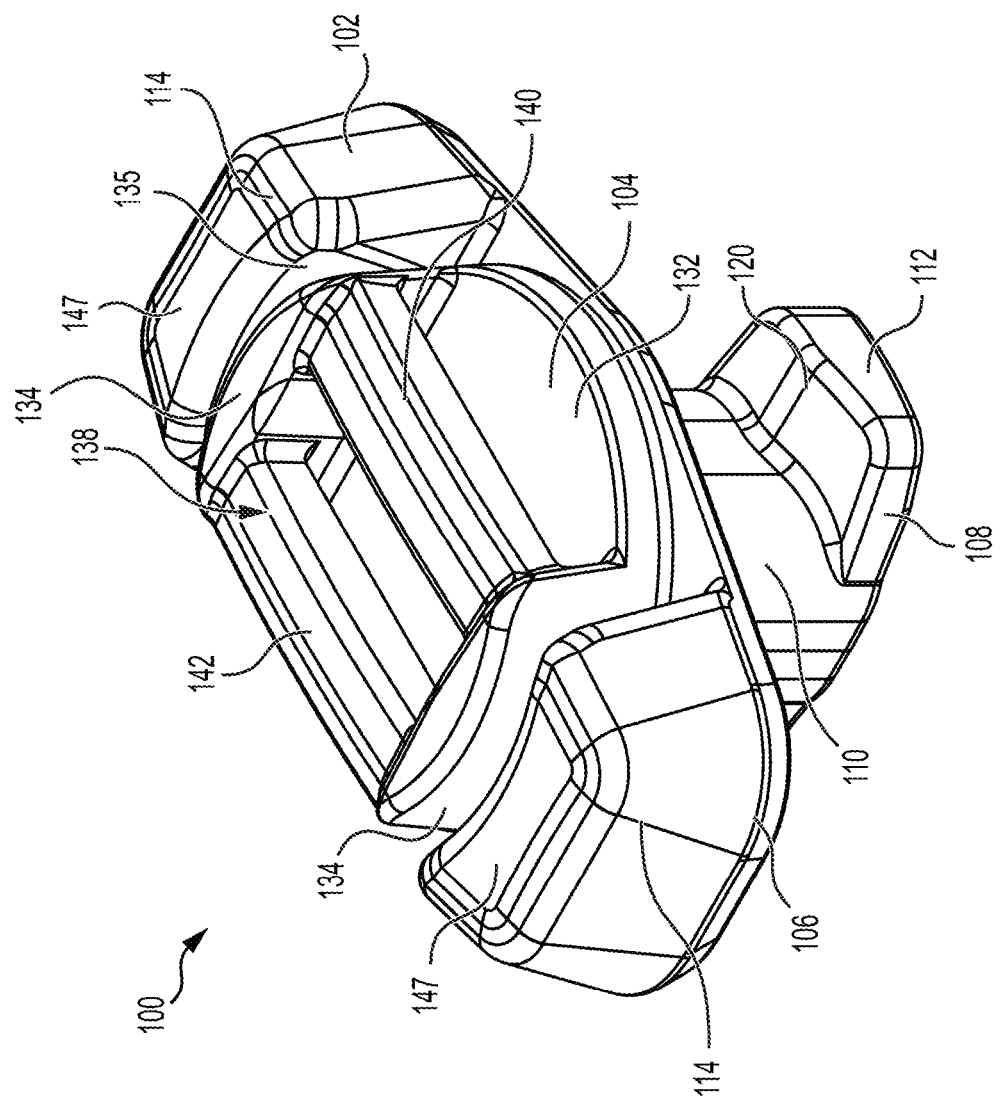
FIG. 7 is a perspective view, taken from a top, rear, left side, of one of the strap anchors of the watercraft of FIG. 1.

The anchor lock 108 is configured to be inserted through the corresponding aperture 74 defined by the accessory receiving base 60. The anchor lock 108 is disposed at a lower end of the cylindrical outer stem 110. In this embodiment, the anchor lock 108 has two cams 112 extending from the outer stem 110 in opposite directions from each other. As best shown in FIG. 11, the anchor lock 108 has a generally hexagonal shape that is elongated in a direction D2. As can be seen, the direction D2 is perpendicular to the direction D1 along which the anchor base 106 is elongated. Thus, the anchor lock 108 is disposed perpendicularly to the anchor base 106. This can be helpful to easily and securely mount the strap anchor 100 to the accessory receiving base 60. It is contemplated that, in other embodiments, the direction D2 may be generally perpendicular to the direction D1 (e.g., within 30° of being perpendicular) or may be parallel. On its lower side, the anchor lock 108 defines a recess 123 through which an opening 111 (FIGS. 12, 13) defined by the outer stem 110 is accessible. As will be described in greater detail below, a fastener 170 (FIG. 12) is insertable into the opening of the outer stem 110 through the recess 123 to connect the pivoting portion 104 to the mounting portion 102. As shown in FIGS. 7 and 9, in this embodiment, the cams 112 of the anchor lock 108 have upper tapered surfaces 120 (one of which is shown in FIGS. 7 and 9) which may enhance engagement with the lower surface 75 of the accessory receiving base 60 to securely mount the strap anchor 100 to the accessory receiving base 60. The upper tapered surfaces 120 may be omitted in other embodiments.

Figure 10:
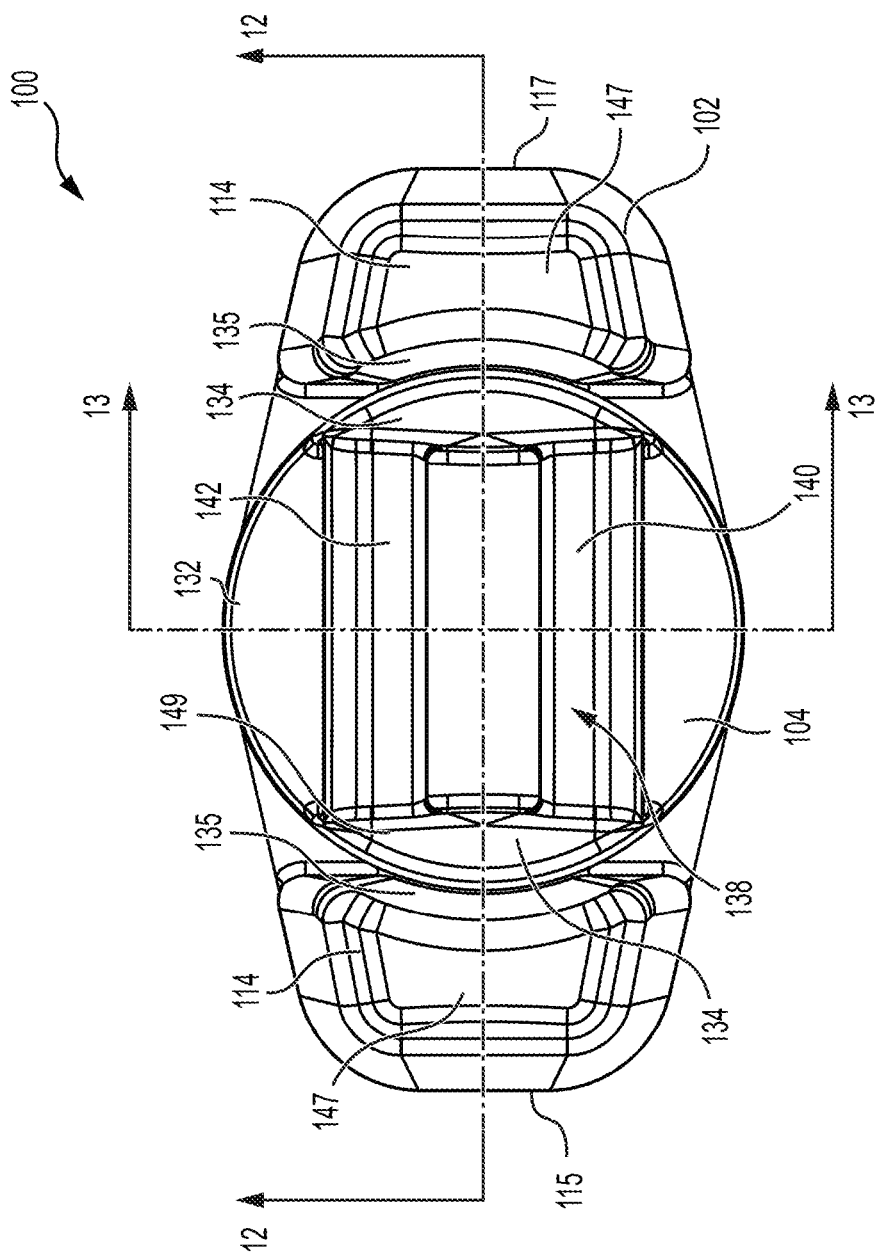
FIG. 10 is a top plan view of the strap anchor of FIG. 7.

As best shown in FIGS. 7 and 10, the pivoting portion 104 has an upper base section 132 that is disposed on the anchor base 106. The upper base section 132 supports a strap-receiving part 138 that is configured to receive the strap 55. As can be seen, the upper base section 132 and the strap-receiving part 138 are disposed between the two protruding bodies 114. In this embodiment, respective inner surfaces 135 of the two protruding bodies 114, facing the upper base section 132 and thus the pivot axis PA, are curved to surround a curved outer surface of the upper base section 132 and of two side supports 134 of the strap-receiving part 138. The inner surfaces 135 are spaced from the curved outer surface of the upper base section 132 and the side supports 134. In this embodiment, the strap-receiving part 138 is a buckle, sometimes referred to as a ladder lock buckle although other adjustable buckles are contemplated, that includes the two side supports 134 extending upwardly from the upper base section 132 and two bars 140, 142 that extend between the side supports 134. The two bars 140, 142 extend parallel to each other and allow the strap 55 to be wrapped thereabout, as shown schematically in FIG. 13, in order to engage the strap 55 with the strap anchor 100. In this example, the strap 55 is made of a fabric webbing (e.g., nylon webbing) and has a width of approximately 1 inch. Other configurations and sizes of the strap 55 are contemplated in other embodiments. As will be appreciated, in this embodiment, the strap-receiving part 138 is fixed to the strap anchor 100 and is also configured to adjust a position of an end of the strap 55 relative to the strap-receiving part 138. Notably, the end of the strap 55 can be pulled to tighten the strap 55, thereby adjusting a force exerted by the strap 55 on the accessory 50. The strap 55 may also be engaged with the strap anchor 100 differently. For instance, as shown in FIG. 14, the strap 55 could be engaged with the strap anchor 100 by looping the strap 55 underneath both bars 140, 142 of the strap-receiving part 138. In such an implementation, the strap 55 is engaged with the strap anchor 100 but the strap 55 is not tightened via its engagement with the strap-receiving part 138. Rather, as can be seen, in this case, one end of the strap 55 is affixed to the accessory 50 while another end of the strap 55 engages a buckle 77 (shown schematically in FIG. 14) such as a ladder lock buckle (or any other suitable adjusting device such as a hook and loop fastener for example) to allow tightening of the strap 55. The buckle 77 may also be fixed to the accessory 50 via another strap (not shown) that wraps about the accessory 50.

Figure 12:
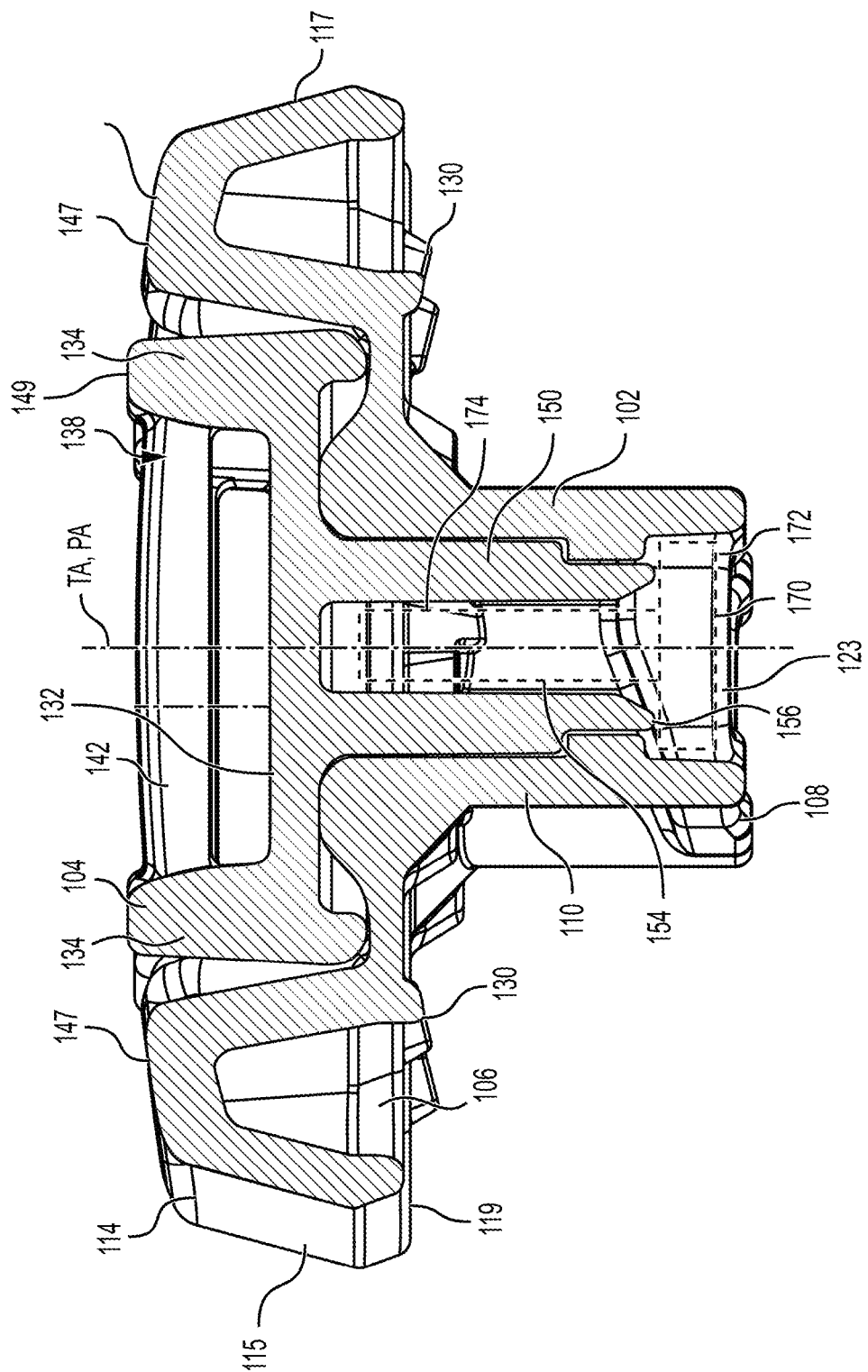
FIG. 12 is a cross-sectional view of the strap anchor of FIG. 7 taken along line 12-12 in FIG. 10.

As shown in FIG. 12, in this embodiment, the strap-receiving part 138 has an upper surface 149 that is generally aligned with respective upper surfaces 147 of the two protruding bodies 114. As such, the strap-receiving part 138 does not protrude significantly from the surround protruding bodies 114. This may allow the anchor 100 to be relative compact. In other embodiments, the upper surface 149 of the strap-receiving part 138 may be disposed significantly higher or lower than the upper surfaces 147 of the protruding bodies 114. This may minimize the risk of interference between the strap 55 and the mounting portion 102.

It is contemplated that the strap-receiving part 138 could be configured differently in other embodiments. For instance, in some embodiments, the strap-receiving part 138 could be a hook and loop type fastener, a snap button fastener, or any other suitably type of fastener for connecting a strap. It is understood that the strap 55 could be modified to have a matching fastener to be secured to the strap-receiving part 138 accordingly.

Figure 13:
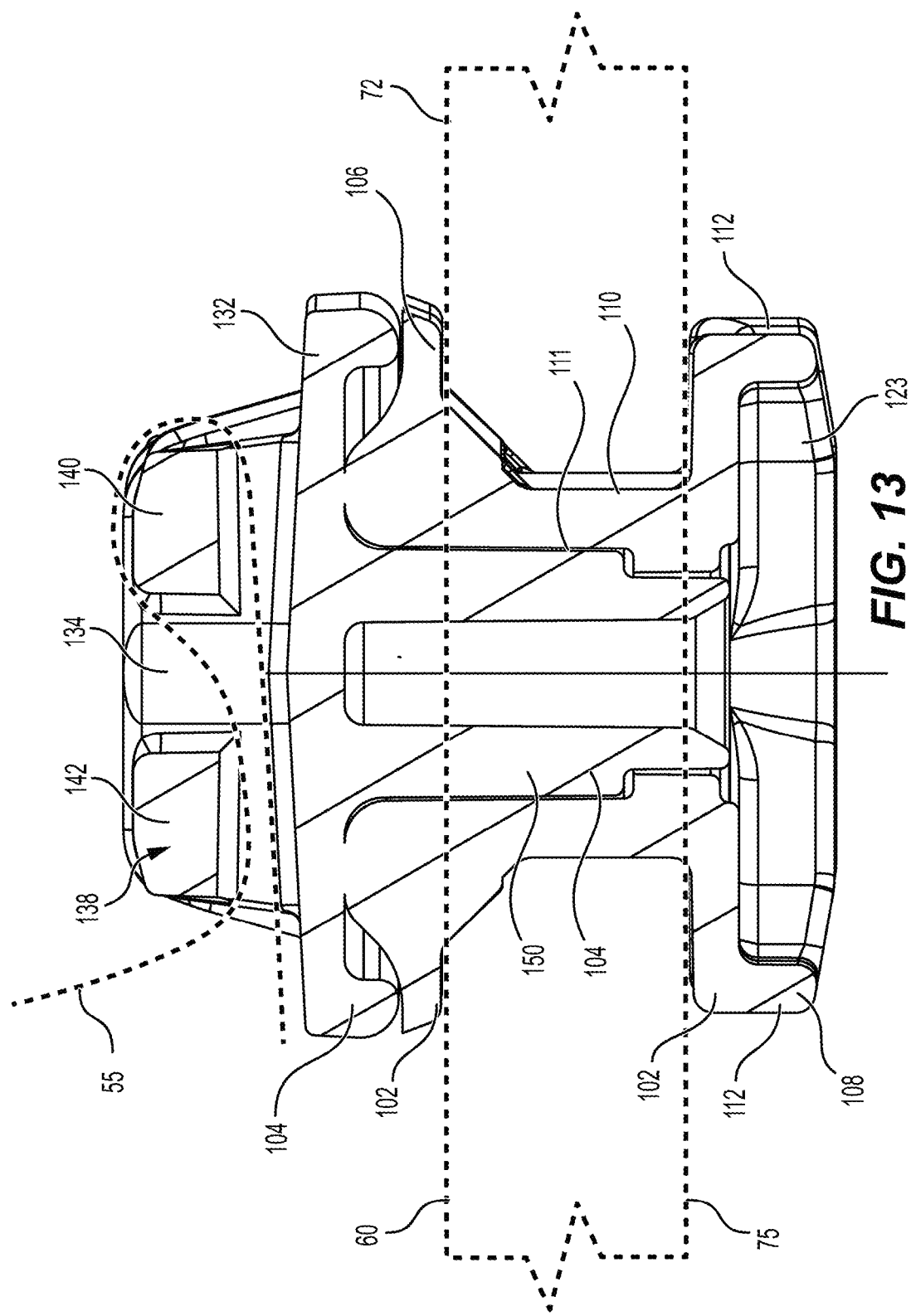
FIG. 13 is a cross-sectional view of the strap anchor of FIG. 7 taken along line 13-13 in FIG. 10, showing a strap engaged with the strap anchor.
Figure 14:
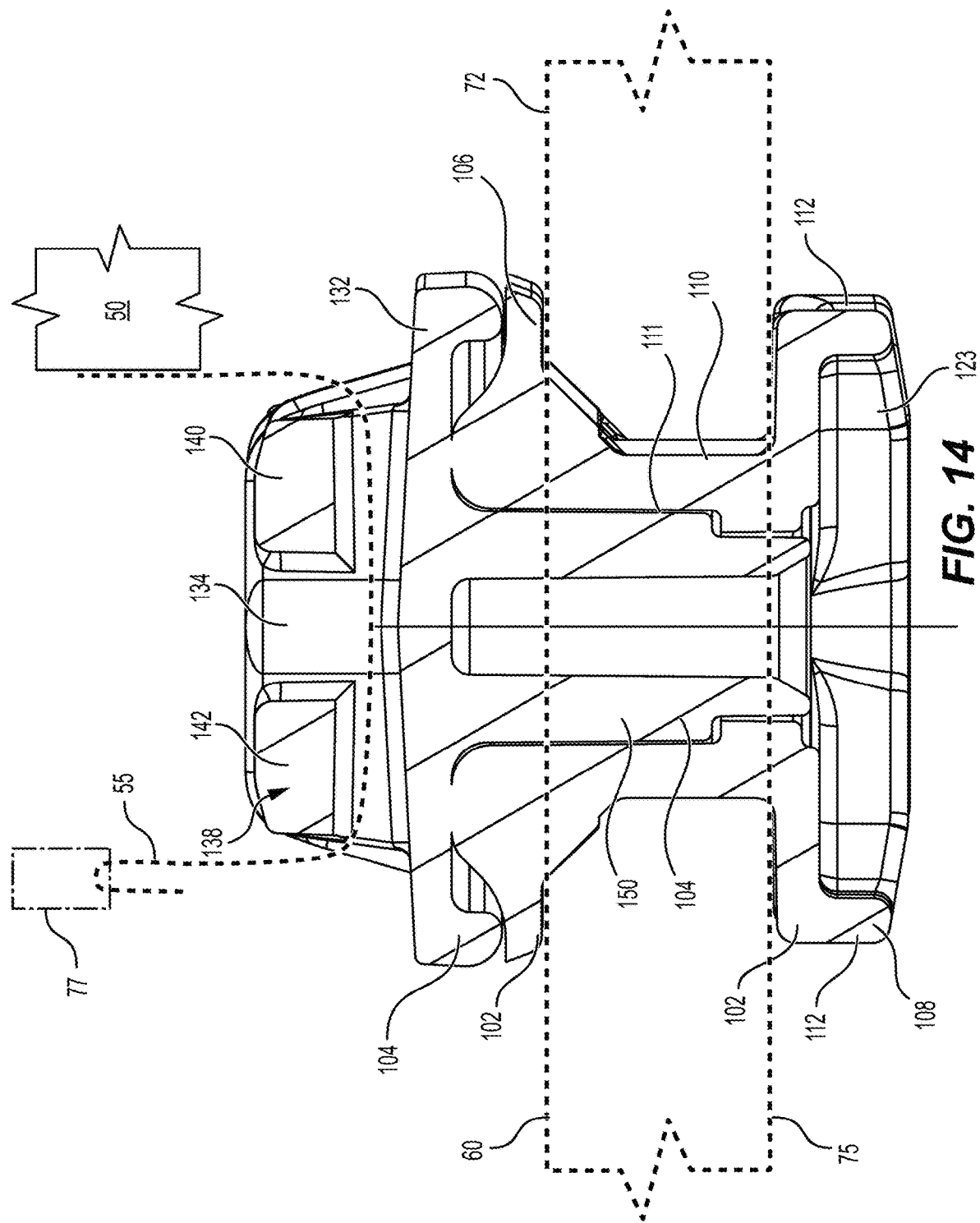
FIG. 14 is the cross-sectional view of FIG. 13 showing the strap engaged with the strap anchor in an alternative manner.

As shown in FIGS. 12 and 13, a stem 150 of the pivoting portion 104 extends downward from the upper base section 132 and within the opening 111 of the outer stem 110. The stem 150 may thus be referred as an inner stem 150. The inner stem 150 extends along the pivot axis PA. The inner stem 150 has a lower end 156 and defines an inner cavity 154. The fastener 170 (FIG. 12) retains the inner stem 150 within the opening 111 to prevent the pivoting portion 104 from being disengaged from the mounting portion 102. In particular, a threaded shank 174 of the fastener 170 extends into the inner cavity 154 of the inner stem 150 while a head 172 of the fastener 170 is disposed at the lower end 156 and is prevented from entering the inner cavity 154 as its size is greater than the diameter of the inner cavity 154. In this embodiment, the fastener 170 is a self-tapping screw. Other types of fasteners are contemplated in other embodiments.

As will be appreciated, the pivoting portion 104 has a significant rotational range of motion about the pivot axis PA. In particular, without the strap 55 engaged with the strap-receiving part 138 (i.e., without being limited by being tied to the accessory 50), the pivoting portion 104 is free to pivot relative to the mounting portion 102 about the pivot axis PA by any given angle (i.e., 360° freedom of rotation about the pivot axis PA). This may be helpful to enable the strap 55 to extend in any desired direction relative to the mounting portion 102.

In order to removably fix the strap anchor 100 to the accessory receiving base 60, the anchor lock 108 is inserted through the corresponding aperture 74 until the anchor base 106 engage the upper surface 72 of the accessory receiving base 60. The mounting portion 102 is then turned relative to the accessory receiving base 60 about a turning axis TA (FIGS. 9, 12) that, in this embodiment, is coaxial with the pivot axis PA. As will be appreciated, the turning axis TA extends through the aperture 74 as the strap anchor 100 is being mounted to the accessory receiving base 60. In this embodiment, the mounting portion 102 is turned by a quarter turn (i.e., 90°) about the turning axis TA. The angle may vary in other embodiments (e.g., the mounting portion 104 may be turned by any other angle that is not close to 180°). In use, with the strap 55 engaged with the strap-receiving part 138, the pivoting portion 104 is configured to pivot relative to the mounting portion 102 which may allow the strap 55 to freely move to an orientation that is most suitable for the accessory 50 being secured to the PWC 10.

In this embodiment, while turning the mounting portion 102 about the turning axis TA, the upper tapered surfaces 120 of the anchor lock 108 engage the lower surface 75 (see FIG. 13) of the accessory receiving base 60, forming a ramp that progressively exerts a force between the upper tapered surfaces 120 and the lower surface 75 to securely affix the strap anchor 100 to the accessory receiving base 60.

Once the mounting portion 102 has been turned relative to the accessory receiving base 60, as shown in FIG. 13, the anchor lock 108 is disposed beneath the lower surface 75 of the accessory receiving base 60 and is oriented such that the anchor lock 108 is prevented from being extracted through the aperture 74. In this embodiment, the strap 55 is tied to the accessory 50 prior to turning the strap anchor 100 about the turning axis TA. Nevertheless, it is contemplated that, in other embodiments, the strap 55 may be tied to the accessory 50 after turning the strap anchor 100 (i.e., after mounting the strap anchor 100 to the accessory receiving base 60). As shown in FIGS. 1 to 3, in this embodiment, each strap 55 is engaged with a corresponding strap anchor 100 is tied to one of a rear end 52 and a front end 54 of the accessory 50. It is contemplated that the straps 55 may be secured to the accessory 50 differently in other embodiments. For instance, in some cases, the strap 55 could fasten the accessory 50 to the PWC 10 by overlying the accessory 50 and being engaged with two strap anchors 100 on opposite sides of the accessory 50.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A strap anchor for securing an accessory to a vehicle with a strap, the strap anchor comprising:
a mounting portion comprising:
an anchor base configured to engage an upper surface of an accessory receiving base connected to the vehicle, the anchor base being generally elongated; and
an anchor lock connected to the anchor base, the anchor lock having a generally hexagonal shape that is elongated, the anchor lock being configured to be inserted through an aperture defined by the accessory receiving base; and
a pivoting portion that is pivotably connected to the mounting portion about a pivot axis, the pivoting portion comprising a strap-receiving part configured for engaging the strap therewith,
the strap anchor being configured to be removably fixed to the accessory receiving base by inserting the anchor lock through the aperture and then turning the mounting portion relative to the accessory receiving base such that the anchor lock is prevented from being extracted through the aperture.

2. The strap anchor of claim 1, wherein the anchor lock has at least one upper tapered surface configured to engage a lower surface of the accessory receiving base during turning of the mounting portion relative to the accessory receiving base.

3. The strap anchor of claim 1, wherein the strap anchor is configured to be fixed to the accessory receiving base by turning the mounting portion by a quarter turn about a turning axis extending, in use, through the aperture.

4. The strap anchor of claim 1, wherein the anchor base comprises at least one locking tab protruding downwardly from a lower base surface of the anchor base to engage an inner surface of the accessory retaining base defining the aperture.

5. The strap anchor of claim 1, wherein, without the strap engaged with the strap-receiving part, the pivoting portion is free to pivot relative to the mounting portion a full rotation about the pivot axis.

6. The strap anchor of claim 1, wherein:
the anchor base comprises a first protruding body and a second protruding body spaced from each other; and
part of the pivoting portion is disposed between the first protruding body and the second protruding body.

7. The strap anchor of claim 6, wherein:
the pivoting portion is pivotable relative to the mounting portion about the pivot axis extending between the first and second protruding bodies;
each of the first and second protruding bodies comprises an inner body surface facing the pivot axis; and
the inner surfaces of the first and second protruding bodies are curved and spaced from a curved outer surface of the part of the pivoting portion.

8. The strap anchor of claim 6, wherein:
each of the first and second protruding bodies has an upper body surface; and
an upper surface of the part of the pivoting portion is generally aligned with the upper body surfaces of the first and second protruding bodies.

9. The strap anchor of claim 1, wherein the strap-receiving part is configured to adjust a position of an end of the strap relative to the strap-receiving part.

10. The strap anchor of claim 9, wherein the strap-receiving part is a ladder lock buckle.

11. The strap anchor of claim 10, wherein the ladder lock buckle comprises a first bar and a second bar extending generally parallel to each other.

12. The strap anchor of claim 1, wherein the pivoting portion is connected to the mounting portion by a fastener.

13. The strap anchor of claim 12, wherein:
the mounting portion defines an opening;
the pivoting portion comprises a stem extending within the opening of the mounting portion, the stem extending along the pivot axis; and
the fastener retains the stem within the opening to prevent the pivoting portion from being disengaged from the mounting portion.

14. The strap anchor of claim 12, wherein the fastener comprises a fastener head, the fastener head being disposed at a lower end of the pivoting portion.

15. The strap anchor of claim 1, wherein the mounting portion further comprises an outer stem extending between the anchor base and the anchor lock.

16. The strap anchor of claim 15, wherein the anchor lock comprises two cams extending from the outer stem in opposite directions from each other.

17. The strap anchor of claim 1, wherein:
the anchor base is elongated in a first direction; and
the anchor lock is elongated in a second direction that is generally perpendicular to the first direction.

18. An anchor assembly for securing an accessory to a vehicle, comprising:
the strap anchor of claim 1; and
a strap engaged with the strap-receiving part, the strap being configured to be tied to the accessory in order to secure the accessory to the vehicle.

19. A vehicle comprising:
an accessory receiving base defining at least one aperture having a generally elongated hexagonal shape; and
at least one strap anchor according to claim 1 removably fixed to the accessory receiving base, the anchor lock of the at least one strap anchor being disposed beneath a lower surface of the accessory receiving base and being oriented to prevent extraction of the anchor lock through the at least one aperture.

20. A method for securing an accessory to a vehicle using a strap anchor, the strap anchor comprising a mounting portion and a pivoting portion that is pivotable relative to the mounting portion, the method comprising:
inserting an anchor lock of the mounting portion of the strap anchor through an aperture of an accessory receiving base connected to the vehicle until an anchor base of the mounting portion engages an upper surface of the accessory receiving base;
turning the strap anchor to orient the anchor lock such that the anchor lock is prevented from being extracted through the aperture; and
tying a strap engaged with a strap-receiving part of the pivoting portion to the accessory.

21. The method of claim 20, further comprising adjusting a position of an end of the strap relative to the strap-receiving part in order to adjust a force exerted by the strap on the accessory.

22. The method of claim 20, wherein the strap is tied to the accessory prior to turning the strap anchor.

* * * * *